United States Patent [19]

Liu

[11] Patent Number: 5,524,487

[45] Date of Patent: Jun. 11, 1996

[54] LEVEL MEASURING DEVICE WITH AN ARMLESS FLOAT

[76] Inventor: Paul Liu, Room 1004, No. 600, Min Chuan E. Road, Taipei, Taiwan

[21] Appl. No.: 229,710

[22] Filed: Apr. 19, 1994

[51] Int. Cl.[6] .................................................. G01F 23/60
[52] U.S. Cl. .................................................. 73/313; 73/319
[58] Field of Search ........................ 73/313, 319; 338/33, 338/185

[56] References Cited

U.S. PATENT DOCUMENTS

| | | | |
|---|---|---|---|
| 1,681,268 | 8/1928 | Titcomb | 338/33 |
| 3,113,282 | 12/1963 | Coleman | 338/33 |
| 4,345,235 | 8/1982 | Riley et al. | 338/176 |
| 4,435,691 | 3/1984 | Ginn | 338/176 X |
| 5,070,731 | 12/1991 | Baux et al. | 73/313 |
| 5,259,245 | 11/1993 | Liu | 73/319 |

FOREIGN PATENT DOCUMENTS

| | | | |
|---|---|---|---|
| 55312 | 7/1982 | European Pat. Off. | 73/313 |
| 168211 | 1/1986 | European Pat. Off. | 73/313 |

Primary Examiner—William A. Cuchlinski, Jr.
Assistant Examiner—Willie Morris Worth
Attorney, Agent, or Firm—Browdy and Neimark

[57] ABSTRACT

An improved liquid level measuring device with an armless float which is equipped with a pair of symmetric multi-point contact arms hidden inside the armless float so as to protect the same from being damaged in mounting. The present liquid level measuring device has a circuit including two portions each of which is disposed on one side of the sliding pole of the liquid level measuring device, permitting the reduction of the size of the same. A plurality of liquid discharge ditches which can be defined in any form are disposed on each portion of the circuit path for easy expelling of liquid particles adhered on the surface thereof. The multi-point contact arms can scrape off insulating oxydized coatings on the circuit paths in repeated sliding operation thereof so as to permit the contact between the arms and the paths constantly in an effective manner.

5 Claims, 9 Drawing Sheets

LEVEL MEASURING DEVICE WITH AN ARMLESS FLOAT

BACKGROUND OF THE INVENTION

The present invention relates to an improved liquid level measuring device with an armless float which is equipped with a pair of multi-point contact arms secured to the float so as to ensure constant abutment of the contact arms against the surface of a metallic circuit path.

On the metallic circuit path are disposed a plurality of fluid discharge ditches defined in any approximate shape so as to permit a thin liquid film formed on the surface of the metallic circuit path, blocking the contact arms from conductive abutment against the metallic circuit path, to be removed continually as the armless float having multi-point contact arms mounted thereto slidably moves along the pole of the liquid level measuring device.

There are many types of liquid measuring devices available on the market, including an original one with an armless float of the present invention, as shown in FIG. 1. The U.S. Pat. No. 5,259,245 issued Nov. 9, 1993, to the present inventor discloses an original liquid level measuring device with an armless float which has been further improved in this invention, making it operate in a safer, and more certain manner.

In the above cited prior art, there are several disadvantages found in its practical application. That level measuring device uses a single contact arm slidable against the pole thereof on which a metallic circuit path is disposed with a plurality of serial resistors disposed thereon. That contact arm is in abutment with the surface of the a metallic circuit path by way of a single projected point. The single point contact makes the measurement of the liquid level difficult to be as precise as required, since the contact can be fluctuant, i. e., the contact between the contact arm and the metallic circuit path will sometimes be interrupted as the contact arm bumps away from the circuit path in sliding movement.

Furthermore, a single point contact makes the resistance between the contact arm and the metallic circuit path larger than a multi-point contact which is disclosed in the present invention.

Besides, the former patent uses an elongated metallic circuit path having a flat and smooth surface. That flat and smooth surface permits a film or coating of a liquid, such as gasoline, in which the measuring device is emerged, easily to be formed thereon. Such thin film or coating blocks the contact arm from effective abutment against the metallic circuit path in operation.

The proceeding problems can be solved if a plurality of liquid discharge ditches of any approximate shapes are defined on the smooth and flat surface, making liquid particles adhered to the surface be easily expelled from the surface as the contact arm is in sliding abutment thereagainst. Thus, the contact arm and the metallic circuit path are surely kept in conductive abutment with each other all the time.

Moreover, the cited former patent of this inventor puts the metallic circuit path on one side of a pole, which is divided into two portions bridged by the slidable contact arm. Such arrangement will render the size of the level measuring device relatively bulky.

SUMMARY OF THE INVENTION

The primary object of the present invention is to provide an improved liquid level measuring device which is equipped with two multi-point contact arms which are in constant abutment with both sides of a mounting pole of the liquid level measuring device; on each side of the mounting pole a metallic conductive circuit path is disposed.

Another object of the present invention is to provide an improved liquid level measuring device which provided with a plurality of liquid discharge ditches on each metallic circuit path so that a thin film of the liquid on the circuit path will be easily expelled, permitting constant conductive connection of a contact arm to a circuit path.

One further object of the present invention is to provide an improved liquid level measuring device which is equipped with a pair of contact arms each having a plurality of multi-point fingers at each end, so that each arm can scrape off a film of oxydized coating on a metallic circuit path constantly so as to permit the liquid level measuring device to be operated in good condition constantly.

One still further object of the present invention is to provide an improved liquid level measuring device equipped with a pair of multi-point contact arms each of which is in slidable conductive engagement with a metallic circuit path having two portions; each portion is disposed on one side of a mounting pole of the liquid level measuring device so as to effectively reduce the size thereof.

DETAILED DESCRIPTION OF THE PREFERRED EMBODIMENTS

Figure 2:
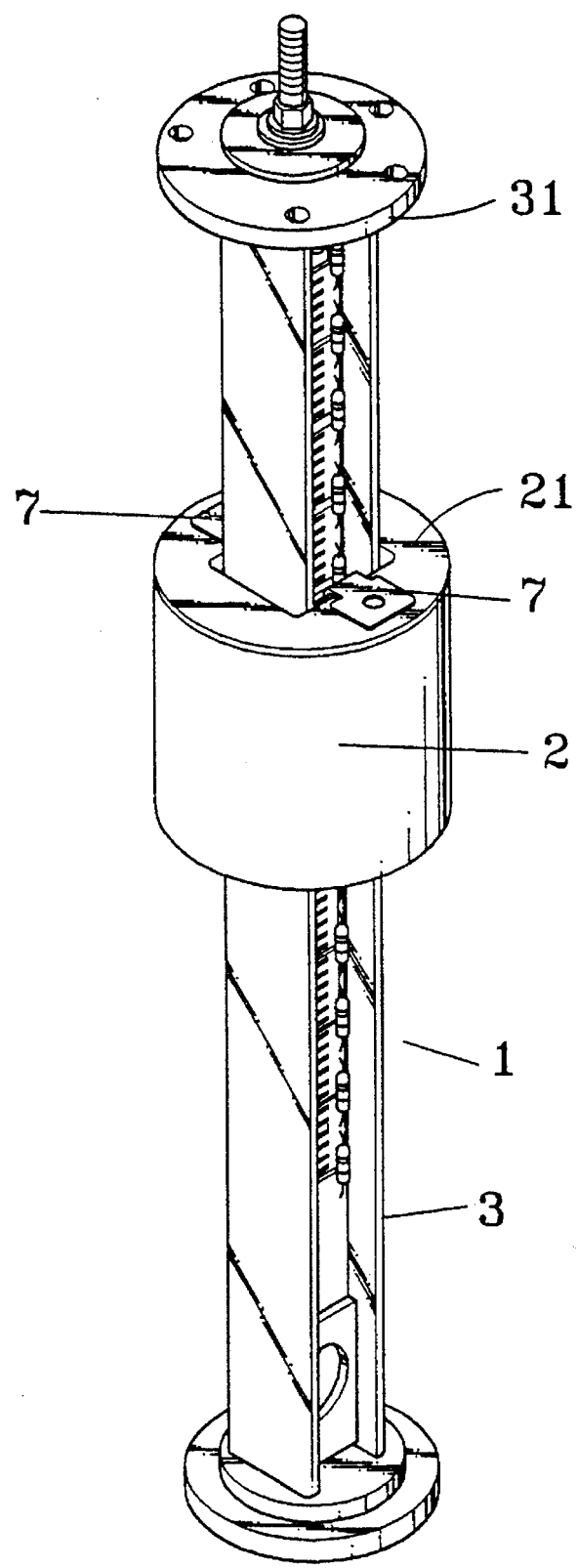
FIG. 2 is a perspective diagram showing the present invention.
Figure 3:
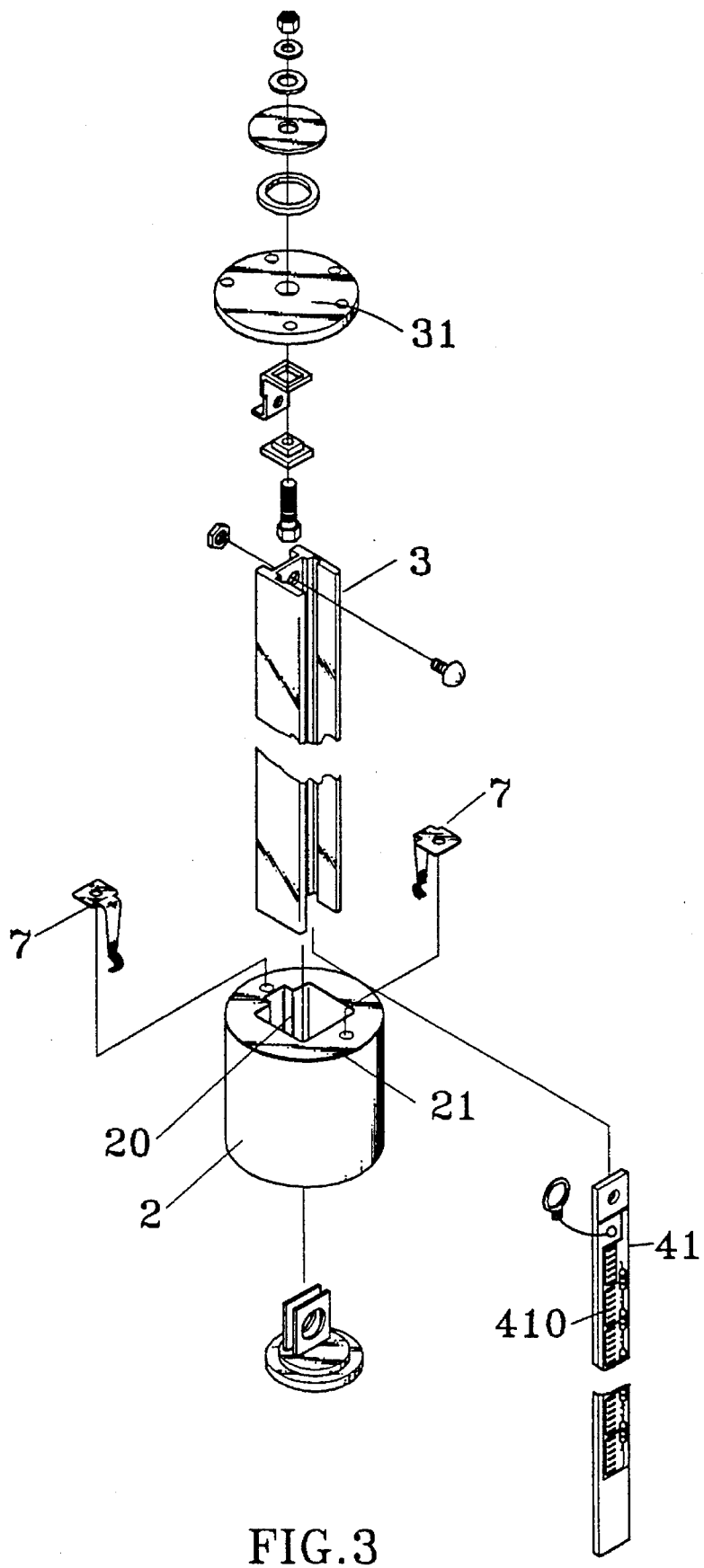
FIG. 3 is a perspective diagram showing the exploded components of the present invention.

Referring to FIGS. 2, 3, the present invention relates to an improved liquid level measuring device 1 with an armless float 2 which is provided with a pair of multi-point contact arms 7.

Figure 1:
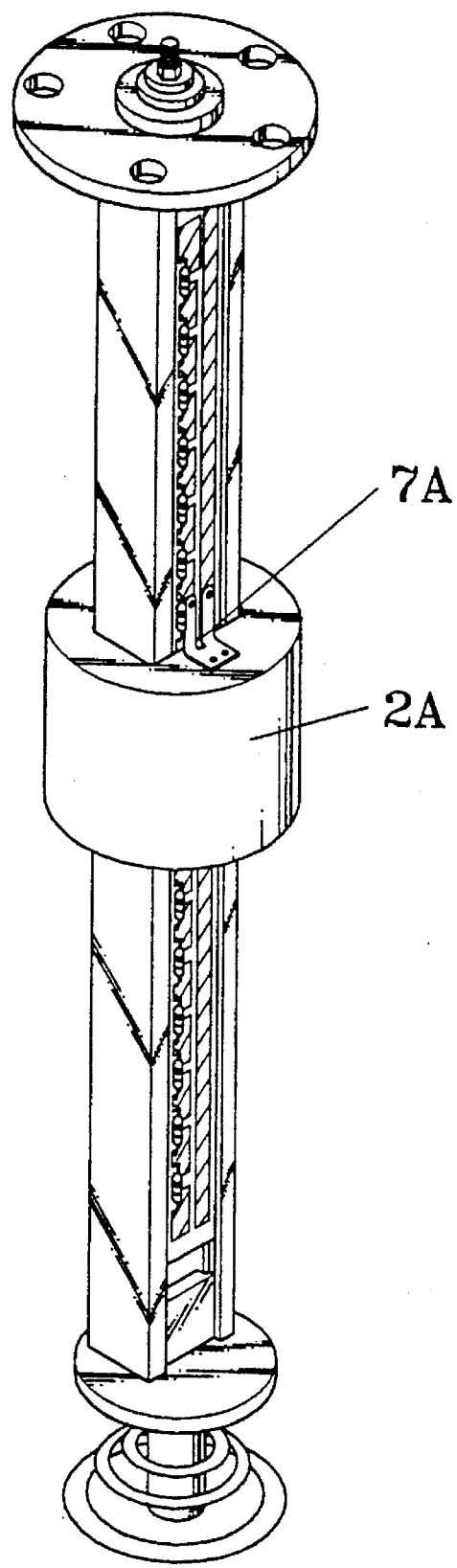
FIG. 1 is a diagram showing a prior art liquid level measuring device with an armless float.

As shown in FIG. 1, the armless float 2A of the prior art has a contact arm 7A which is mounted externally of the armless float 2A. In contrast, the present invention is equipped with a pair of symmetric contact arms 7 that are disposed inside the through hole 20 of the armless float 2.

Figure 6:
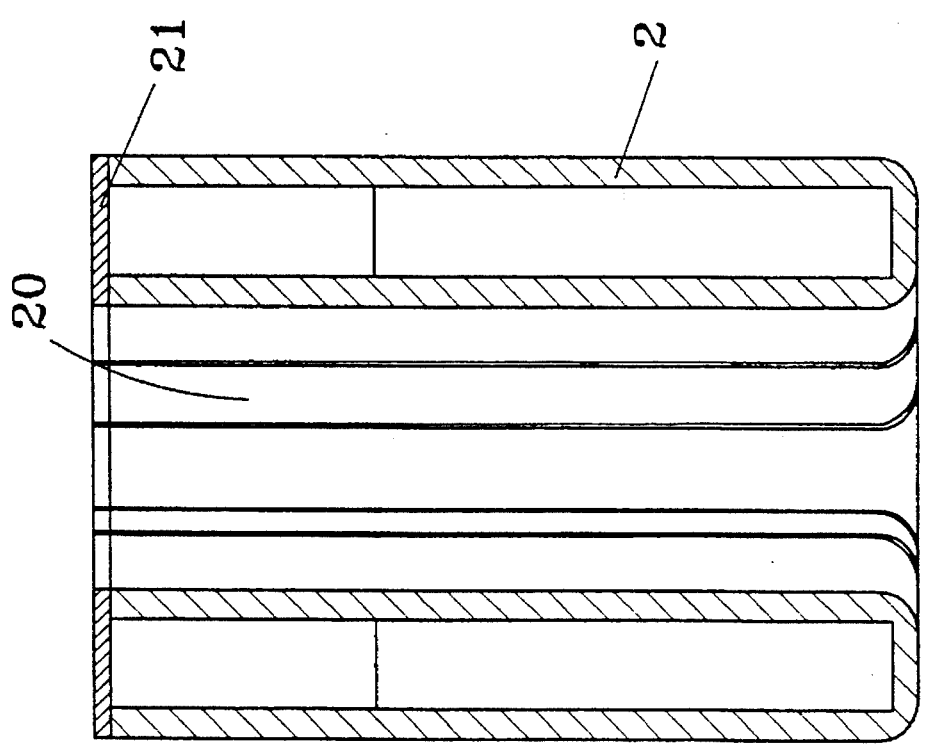
FIG. 6 is a sectional view of the armless float.
Figure 7:
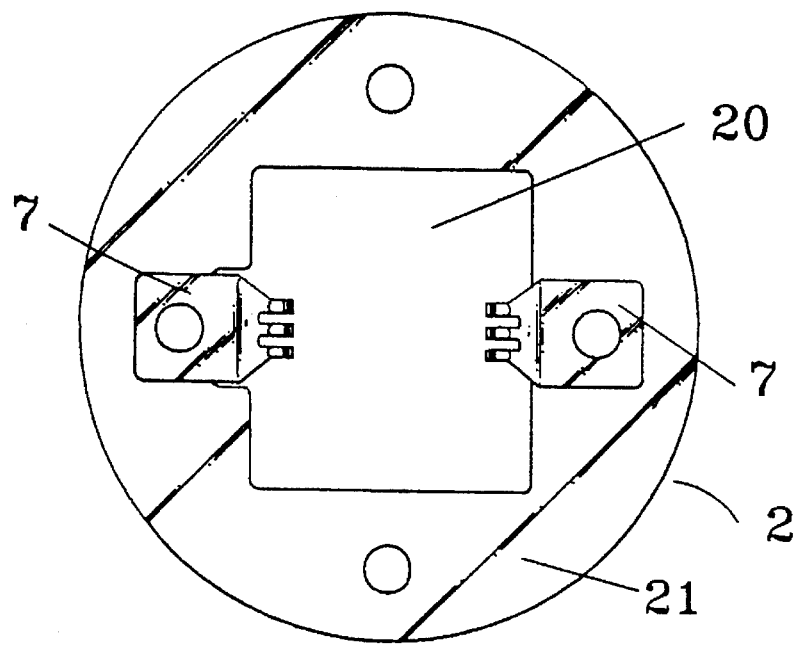
FIG. 7 is a top view of the armless float.
Figure 8:
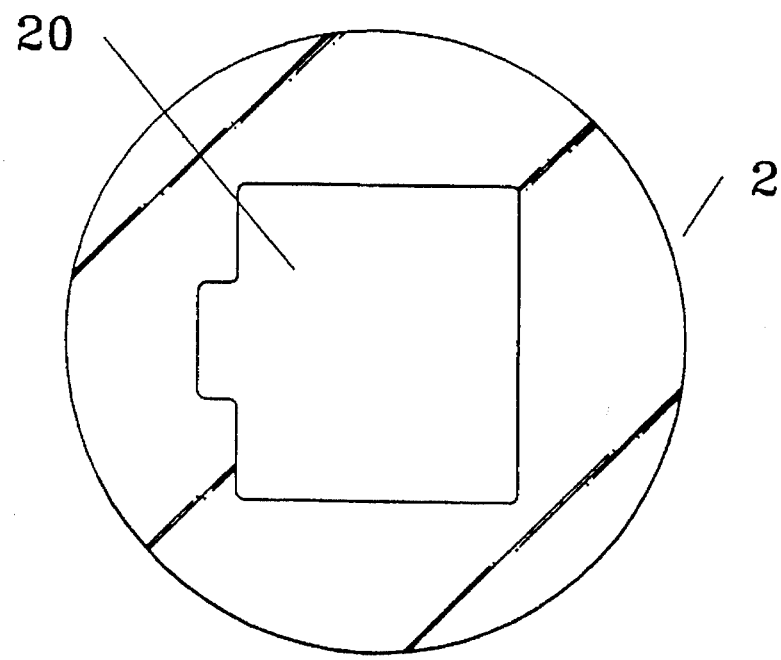
FIG. 8 is a bottom view of the armless float.
Figure 12:
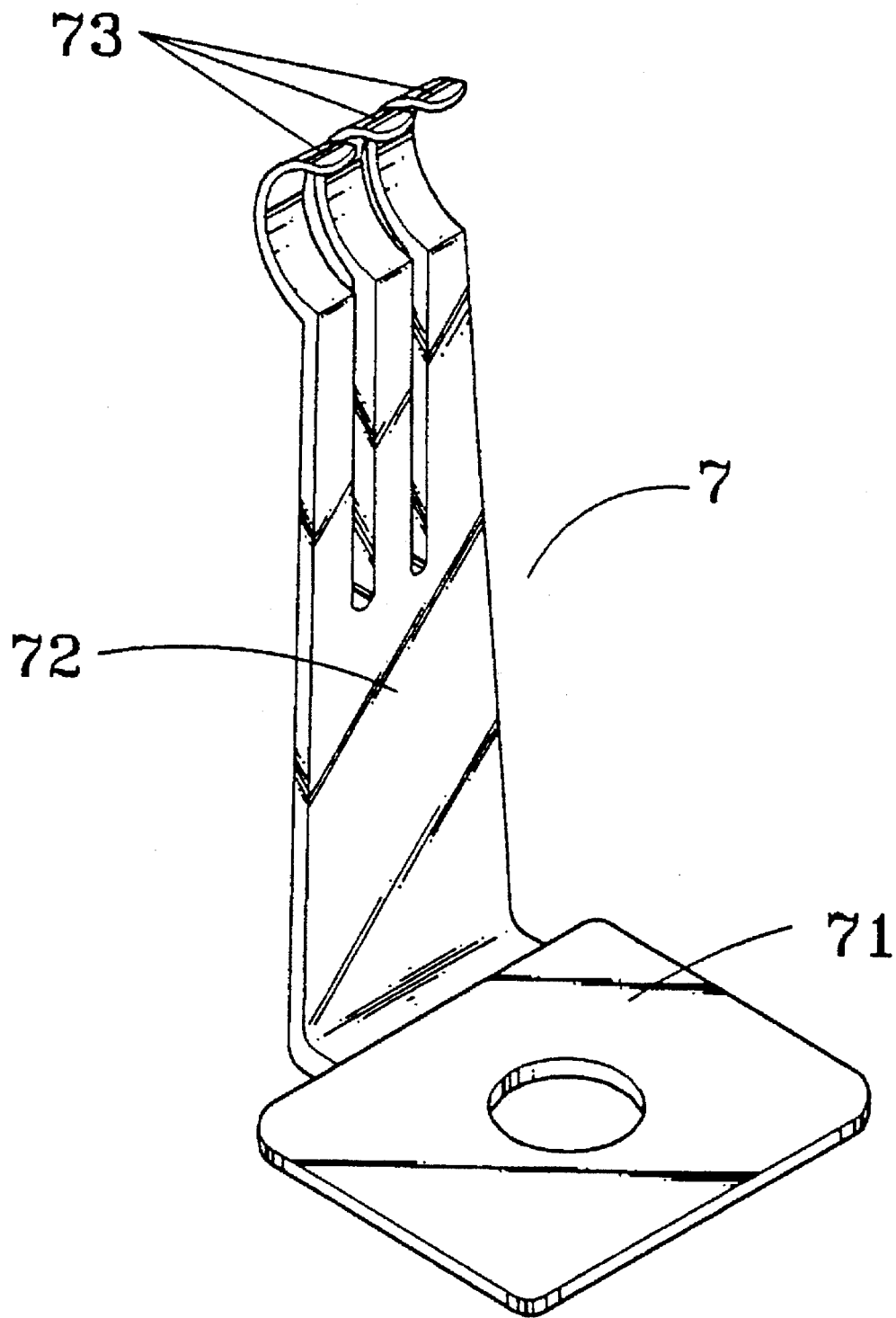
FIG. 12 is a diagram showing a multi-point contact arm of the present invention.
Figure 13:
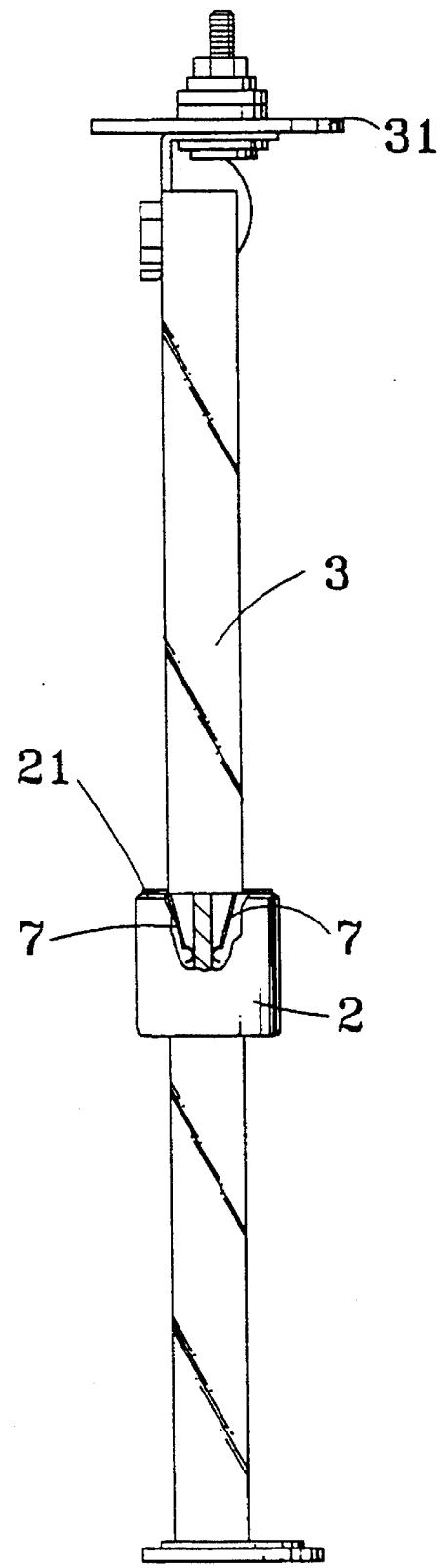
FIG. 13 is a side plane view of the present invention with the float partially cut away for illustration of the contact arms in abutment with metallic circuit paths on the sides of a mounting pole.

Referring to FIG. 12, each contact arm 7 has a securing portion 71 and an arm portion 72 which terminates in a number of flexible fingers 73. As shown in FIGS. 6, 7, 8, the top of the armless float 2 is provided with a conductive metallic board 21 made of copper or a like material. The contact arms 7 are riveted to the metallic board 21 by way of the securing portions 71 respectively.

The liquid level measuring device 1 has a mounting pole 3 having an H-shaped cross section; the armless float 2 is slidably mounted onto the mounting pole 3. On one side of the mounting pole 2 is disposed a printed circuit PC or a first metallic circuit path 41, and a second metallic circuit path 42 on the other side thereof.

Figure 4:
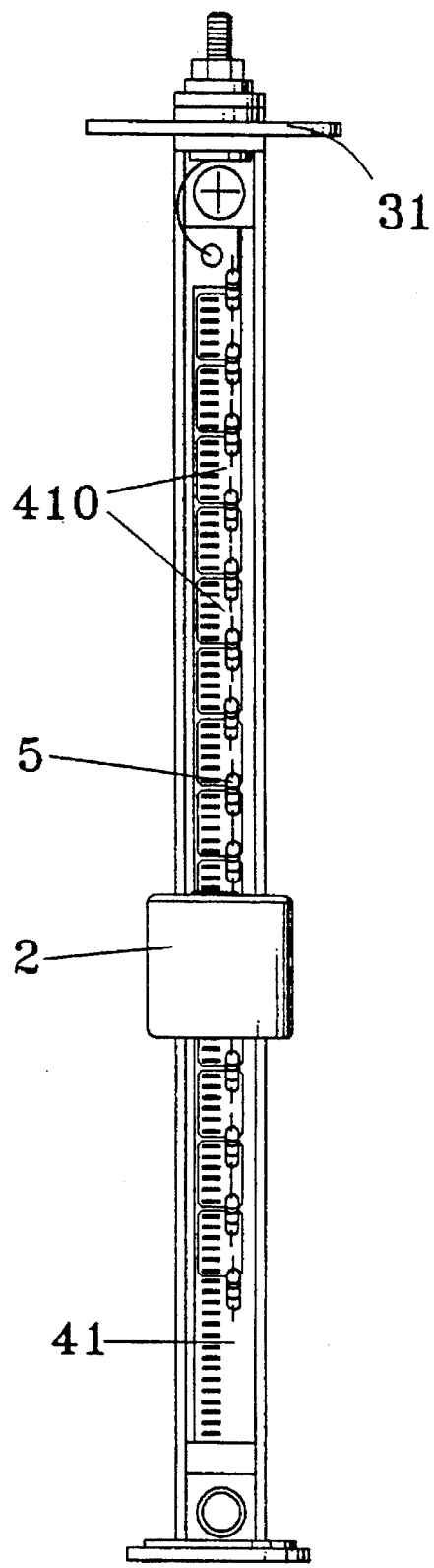
FIG. 4 is a front side view of the present liquid level measuring device.
Figure 5:
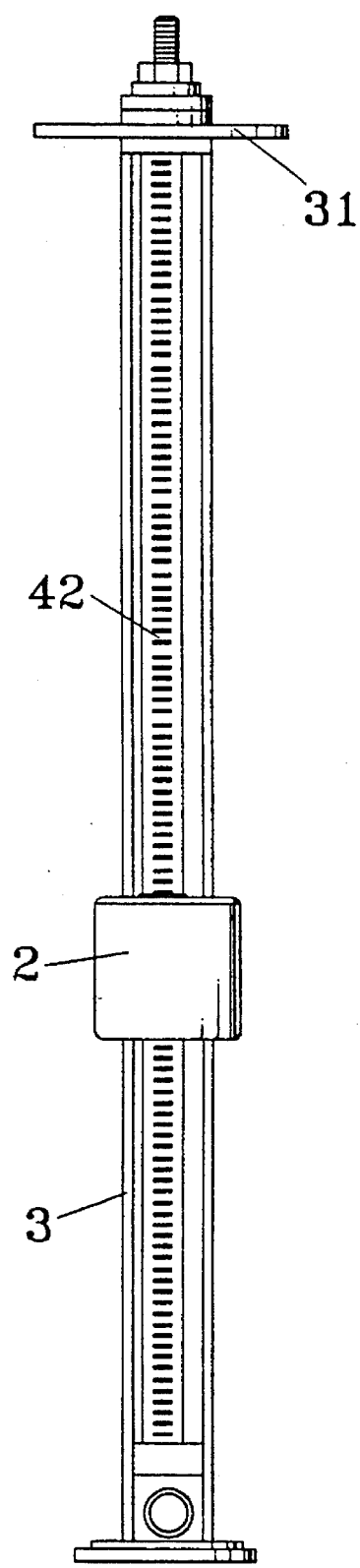
FIG. 5 is a rear side view of the present liquid level measuring device.

Referring to FIGS. 4, 5, the contact arms 7 are in slidable abutment with the first and second metallic circuit paths 41 and 42 respectively by way of the multiple flexible fingers 73. In the first metallic circuit path 41 are disposed a plurality of separated circuit units 410 which are sequentially connected to each other by a plurality of serial resistors 5. One of the contact arms 7 is in slidable abutment with the first metallic circuit path 41 and the other contact arm 7 is in slidable engagement with the second metallic circuit path 42.

Bridged by way of the conductive metallic board 21 and the contact arms 7, the first metallic circuit path 41 and the second metallic circuit path 42 are electrically associated with each other. Since the first circuit path 41 is connected to a gauge and the second circuit path 42 is grounded by way of connection to the body of a gas tank, such an arrangement makes the first and second circuit paths 41 and 42 in a closed loop.

The up and down slide of the contact arms 7 against the first and second circuit paths 41, 42 can vary the total resistance of the liquid level measuring device 1 as a result of the linear variation of the total resistance of the serial resistors 5.

Figures 9, 10, 11:
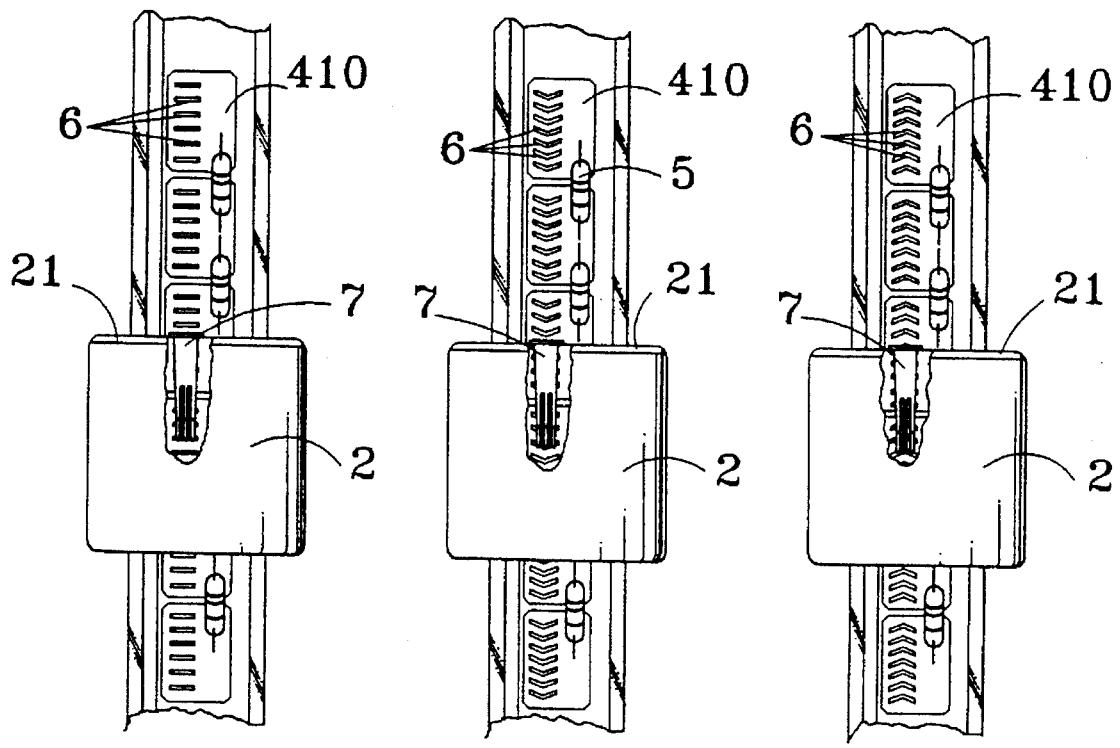
FIG. 9 is a diagram showing one type of discharge ditches disposed on the conductive metallic circuit path.
FIG. 10 is a diagram showing another type of discharge ditches disposed on the conductive metallic circuit path.
FIG. 11 is a diagram showing one further type of discharge ditches disposed on the conductive metallic circuit path.

Referring to FIGS. 9, 10, 11, on the first and second circuit paths 41, 42 are provided with a plurality of discharge ditches 6 that can be defined in any proper Shapes, such as a horizontal line, V-shaped or reverse V-shaped figure or a curved line that are best suitable for effective expelling liquid particles on the circuit paths.

As shown in FIGS. 6, 7, 8, 13, the sectional view of the armless float 2 illustrates the symmetric placement of the contact arms 7 inside the through hole 20 of the armless float 2. Such arrangement of the contact arms 7 can protect the same from accidentally damaged in assembly, greatly reducing the chance of malfunction of the liquid level measuring device of the present invention as a result of damage of the contact arms which are exposed externally in the prior art, as shown in FIG. 1.

The angle between the end fingers 73 and the securing portion 71 of each contact arm 7 is an obtuse one so that the flexible fingers 73 at the end of each contact arm 7 can be in tight abutment against the first or second metallic circuit path 41, or 42.

In summary, the characteristics of the present invention are listed as below:

1. The two multi-point contact arms, instead of one as shown in the prior art, which are hidden inside the armless float for protection purpose.
2. The provision of the discharge ditches on the metallic circuit paths which permit easy expelling of the adhered liquid particles off the surfaces of the circuit paths, permitting assured contact of the contact arms with the circuit paths in operation.
3. The location of the circuit path on each side of the pole of the liquid level measuring device makes reduction of the size of the device possible.
4. The multi-point contact arms slides against the surfaces of the circuit paths and scrapes off oxydized coating formed on the paths, making the conductive contact of the contact arms and the circuit paths reliable.

Other changes or modifications in the specifically described embodiments can be carried out without departing from the principals of the invention which is intended to be limited only by the scope of the appended claims, as interpreted according to the principles of patent law, including the Doctrine of Equivalents.

I claim:

1. An improved liquid level measuring device with an armless float for use on a vehicle, comprising:

a pole having an H-shaped cross section and two sides;

an armless float having a through hole disposed at a center thereof being slidably mounted onto said pole;

an electrically conductive board disposed at a top of said float;

first and second contact arms each having a first end extending through said through hole and a second end electrically and conductively fixed to said conductive board;

said second end of each contact arm having a multi-point circuit end;

an electric circuit having a first circuit path and a second circuit path disposed on respective sides of said pole;

said second end of said first contact arm being in slidable and conductive abutment against said first circuit path and said second end of said second contact arm being in slidable and conductive abutment against said second circuit path;

said first circuit path comprising a plurality of separated portions each of which is connected to an adjacent portion by a resistor;

said first circuit path being connectable to a gauge and said second circuit path being connectable to ground by way of connection to a gas tank body;

said first circuit path and said second circuit path being provided with a plurality of liquid discharge ditches so as to permit easy expelling of liquid particles adhered thereon;

whereby as said armless float slidably moves in response to liquid level in said gas tank of said vehicle, and resistance of said first circuit path will vary accordingly with the position of said contact arms.

2. An improved liquid level measuring device with an armless float as claimed in claim 1 wherein each said contact arm has a securing portion at said second end and said multi-point circuit end comprises a plurality of flexible hooked fingers.

3. An improved liquid level measuring device with an armless float as claimed in claim 1 wherein each liquid discharge ditch of said liquid discharge ditches is form in the shape of a horizontal line.

4. An improved liquid level measuring device as claimed in claim 1 wherein each liquid discharge ditch of said liquid discharge ditches is formed to have a V-shape.

5. An improved liquid level measuring device as claimed in claim 1 wherein each liquid discharge ditch of said liquid discharge ditches is formed to have an inverted V-shape.

* * * * *